June 1, 1971    J. F. HUNT    3,582,355
INCORPORATION OF DOUGH IMPROVING EMULSIFIER
COMPOSITIONS INTO FLOUR
Filed Oct. 19, 1966    3 Sheets-Sheet 1

INVENTOR
JOHN F. HUNT

BY
*Pennie, Edmonds, Morton, Taylor and Adams*
ATTORNEYS

INVENTOR
JOHN F. HUNT

ATTORNEYS

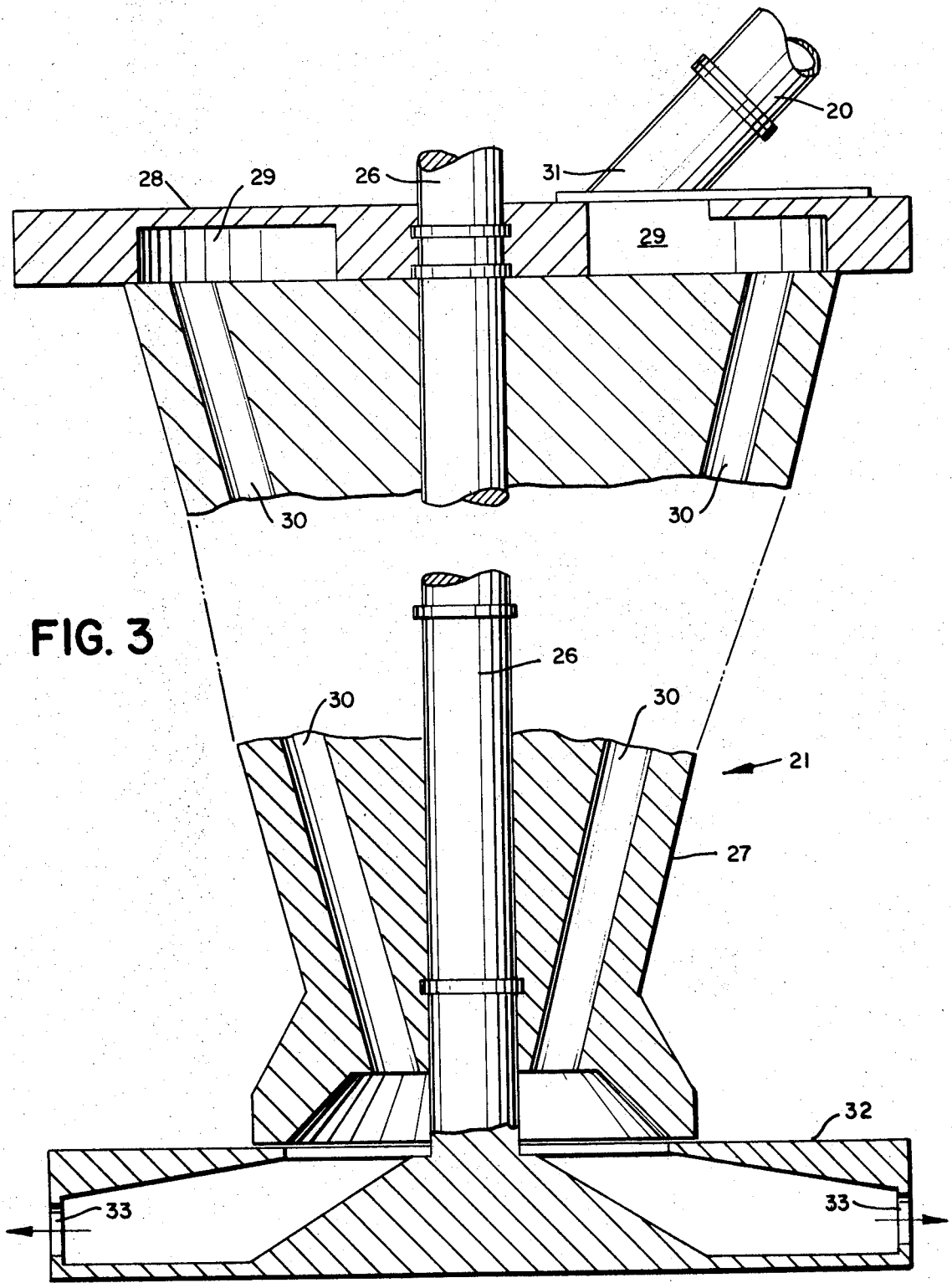

United States Patent Office 3,582,355
Patented June 1, 1971

3,582,355
INCORPORATION OF DOUGH IMPROVING
EMULSIFIER COMPOSITIONS INTO FLOUR
John F. Hunt, Rostrevor, Mereside Road, Cheshire,
Mere, near Knutsford, England
Filed Oct. 19, 1966, Ser. No. 587,762
Int. Cl. A21d 2/16, 2/32
U.S. Cl. 99—94    3 Claims

ABSTRACT OF THE DISCLOSURE

The incorporation of flour material into a mixed product by spraying melted fatty material in an atomized state into a suspension of the flour material, cooling the fatty material and collecting the resultant mixture.

---

The present invention relates generally to the method and apparatus for increasing the effectiveness of fats and related materials in fermented products such as bread so that they achieve their full potentialities in modifying and improving the characteristics of the product.

Fat and fat-like materials are common ingredients in bread and other similar fermented products and are added to improve the characteristics of the product particularly with respect to volume, crumb colour and softness. If, however, such materials are added without modification of their physical state, they are virtually ineffective.

In accordance with the teachings of the present invention, the performance of high melting point fats and fatty materials in bread and like products is improved by modifying their physical state before combining with the product. More particularly, the present invention is directed to the method and corresponding apparatus for mixing fats and fat-like materials, and particularly those containing stearyl tartrate, with wheat flour, malt flour and other farinaceous materials, soya flour (preferably full fat enzyme active soya flour) and milk powder whereby the physical nature of the fat or fat-like material is modified, so as to mix intimately with the flour and render it effective to modify the characteristics of the products made from the flour. To accomplish this result, the fatty material is heated to a liquefied state and reduced to small particles by an atomizing operation. These particles are then mixed with the flour while suspended in air and solidified by a cooling operation. This intimate mixture is then settled out of the atmosphere and collected as the end product ready for combining with additional materials in the production of flour products such as bread and the like.

These and other objects and advantages of the invention will become more apparent upon a reading of the following description with reference being made to the accompanying drawings in which:

FIG. 3 is a cross-sectional view of the atomizer shown in FIG. 1.

Figure 1:
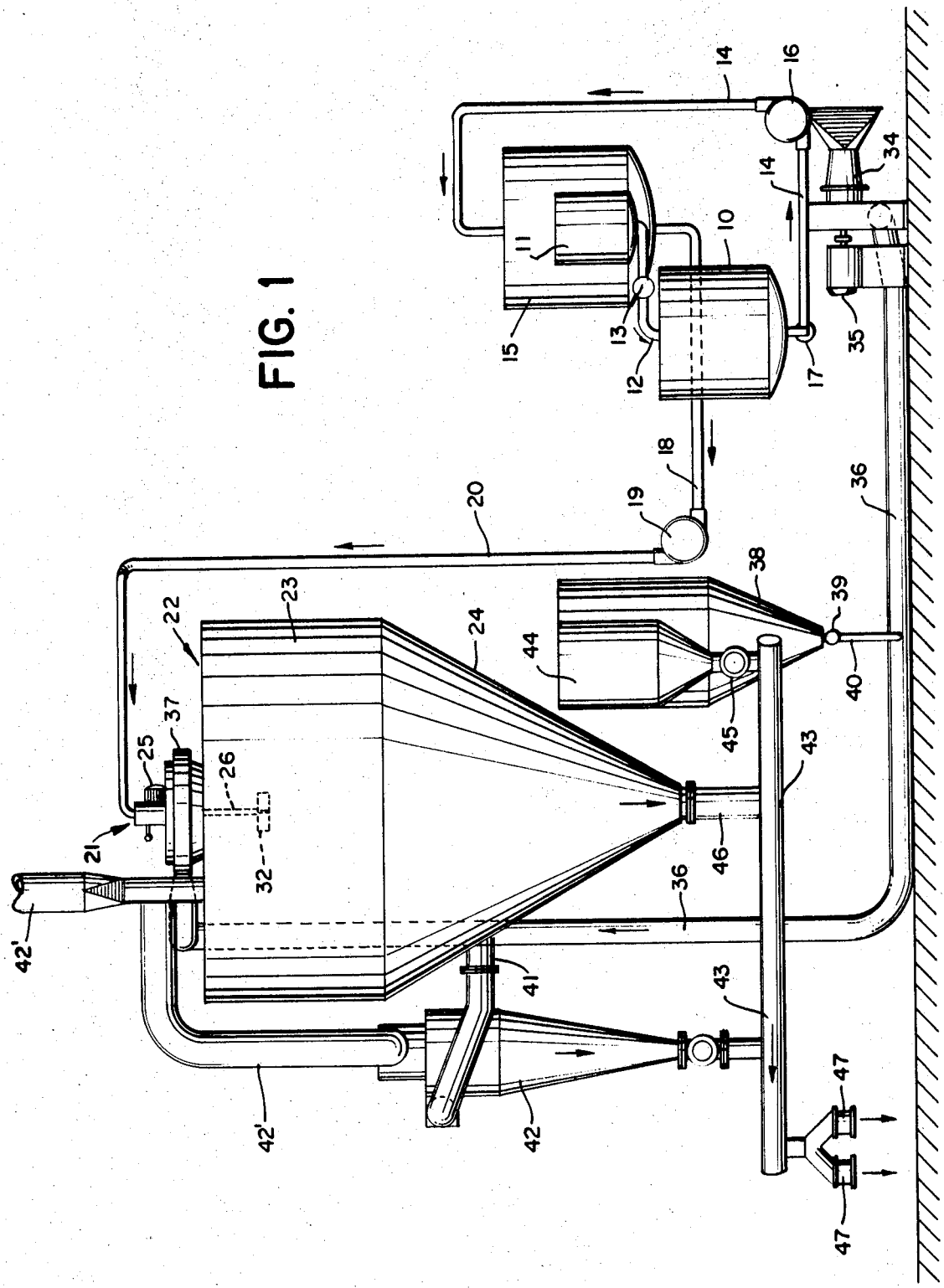
FIG. 1 is a diagrammatic elevation of one form of apparatus for carrying out the method of the invention.

Referring to the drawings, there is shown apparatus for mixing fats or fat-like materials with flour or flour-like material. The apparatus comprises a pair of heated mixing vessels 10 in which a blend of fat or fat-like material is melted. Two reaction vessels 11 are also provided in which one of the ingredients of the fat-like material is prepared.

In the case where an ester is being used as one of the ingredients of the fatty material, esterification can be carried out in one of the reaction vessels 11 after which the product can be run out into the associated mixing vessel 10 and mixed with the other ingedients of the fatty material.

While a first batch of ingredients is being processed in one pair of vessels 10 and 11, a second batch of ingredients can be prepared in the second pair of vessels 10 and 11 thereby ensuring a continuous supply of fatty materials. The vessels 10 and 11 are connected by pipes 12 containing valves indicated at 13.

Each mixing vessel 10 is connected by a pipe 14 to a holding vessel 15 and suitable pumping means 16 and valve means 17 are provided for effecting flow of liquid fat between the two vessels. The holding vessels are, like the mixing vessels, heated for keeping the fat within them in a liquefied state.

A pipe 18 leads from the holding vessel 15 to a metering pump 19 for pumping the liquid fat at a given adjustable metered rate from the vessel 15 and along a pipe 20 to an atomizer 21 mounted at the top of a mixing and cooling chamber 22. The chamber 22 comprises an upper cylindrical part 23 and a lower part 24 having the shape of an inverted cone.

The atomizer comprises an electric drive motor 25 for rotating a vertical shaft 26 which is mounted within a stationary housing 27 extending into the chamber 22 along the vertical axis of the chamber. The shaft 26 is mounted in cooled bearings for rotation at high speed. The top of the housing through which the shaft 26 extends is provided with shelf member 28 having an annular groove 29 therein. This groove faces downwardly and communicates with a plurality of passageways 30 extending through the housing to its lower end. As shown in FIG. 3, the pipe 20 leading from the metering pump 19 is connected to a coupling member 31 which is, in turn, fixed to the shelf member 28 for effecting communication between the pipe 20 and the annular groove 29.

An atomizing disc 32 is provided at the lower end of the shaft 26. As shown in FIG. 3, this disc is of hollow construction and includes a series of radial orifices 33 of small bore along the periphery thereof. In the present apparatus, the disc is 20 cm. in diameter and the shaft 23 carrying the disc with it can be rotated at 15,000 r.p.m. The liquid fat can be fed to the disc and dispersed in the chamber as will be described below at a rate of up to 2,000 pounds per hour.

Figure 2:
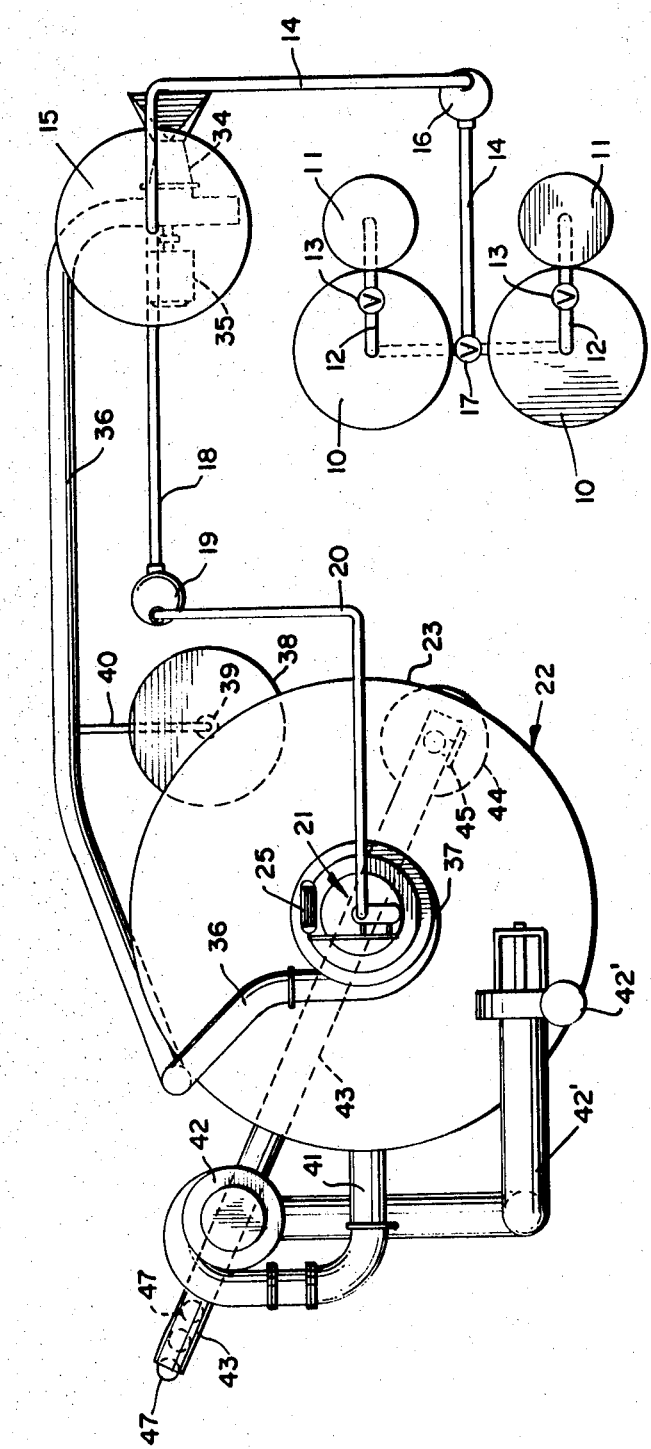
FIG. 2 is a diagrammatic plan view of the apparatus of FIG. 1.

In order to blow flour into the mixing chamber, a compressor 34, driven by an electric motor 35, is provided. Air from the compressor 34 passes along duct 36 to the top of the chamber 22 and enters an upper extension portion 37 of the chamber 22. As shown in FIG. 2, the duct 36 is connected tangentially to the extension 37 and continues around its periphery in the form of a volute casing so that the air flowing along the duct enters the chamber 22 at the top with a swirling motion around the extension portion 37 and around the chamber 22. Flour is fed into the air flowing along the duct 36 from a fluidizer 38 via a metering screw feeder 39 and down a pipe 40. The speed of the screw feeder 39 is variable and accurately controllable to give the desired rate of feed of flour into the duct 36.

In order to relieve the pressure caused in the mixing chamber 22 by the air being blown in, a discharge conduit 41 is connected at one end to the lower conical part 24 of the chamber and at its other end to a cyclone 42. Both air and fat-flour mixture enter the cyclone 42 while the air leaves the cyclone at its upper end and is exhausted to atmosphere through the cyclone and chamber exhaust ducts 42' and the flour particles mixed with the fat leaves the cyclone at its lower end and are fed into a duct 43. The duct 43 leads from a second fluidizer 44 and a screw feeder 45 past the lower end of the chamber 22 to which it is connected by a short duct 46 and there past the cyclone 42 and to outlets 47 disposed at a dispensing station where the end product is delivered and can, for example, be bagged.

The operation of the apparatus will now be described.

Liquid fatty material from the holding vessel is metered to the atomizer 21 at the top of the chamber 22. The fat passes down the passageways 30 of the housing 27 and into the hollow disc 32 which is rotating at high speed as for example 15,000 r.p.m. The fat is therefore carried radially outwardly through the radial orifices 33 in the disc and is thrown off the disc in the form of fine particles of liquid fat. A spray of fine fat particles is thus created in the chamber 22 and these particles form an intimate mixture with the fine particles of flour which enter through the tangential duct 36 and upper extension 37 of the chamber.

The temperature to which the fatty mixture should be heated in the mixing and holding vessels depends upon the component of the mixture which has the highest melting point. For example, with a mixture containing stearyl tartrate as the component with the highest melting point (156° F.), a temperature of this value is required to assure complete liquefication of the mixture. In actual practice, the temperature would be raised to slightly above 156° F. so that the fat will not tend to solidify again during its passage through the pipe 20 to the atomizer 21 and so that it will therefore pass through the orifices in the disc 32 in the form of a liquid spray. The fat particles as they enter the chamber lose heat rapidly to the air and to the flour particles with the result that solid fat particles are intimately mixed with the flour particles and are evenly distributed therethrough.

Since the chamber 22 is much larger in diameter than the duct 36, the air moves more slowly in the chamber and cannot hold up the fat and flour particles. The mixture of flour particles and fat therefore fall down to the bottom of the conical part 24 of the chamber 22, and having entered the duct 46 is entrained in flour moving along the duct 43 from the metering screw feeder 45. The product thus passes to the outlets 47 picking up a further mixture of fat and flour from the cyclone 42 on its way. The direction of flow of the liquid fat and flour through the various pipes and ducts is indicated by the arrows in FIG. 1.

The use of fluidized bed containers from which flour is extracted by screw feeders ensures a constant rate of flow of flour since the screw feeders deliver a constant volume of material and the fluidized beds ensure constant density of the flour.

The chamber 20 is dimensioned in conjunction with the chosen velocity of rotation of the atomizer 21 so that the fat particles are thrown out into the atmosphere of flour dust but do not reach the walls of the chamber 22.

The fat globules produced in the method and apparatus of the present invention just described are from 0 to 50$\mu$ in size, i.e., approximately the same size as flour particles; and therefore, good blending with the flour particles is ensured.

The mixture of fat and flour can be used as an improver in bread dough and the predispersed finely particulate fat is very easily distributed throughout the yeast raised dough when the improver containing the fat is added to the dough during dough mixing.

In choosing a fatty material for mixing with flour, it is very desirable to maintain a balance between fatty components of high melting point and those of low melting point to obtain the best effects from the fats. Preferably, at least 40% by weight of the total amount of fatty material to be added to the flour should be solid at 95° F. so that this amount of the fatty material remains solid at the temperature at which the dough product is manufactured.

The importance of the temperature of 95° F. and the employment of 40% of fatty material which is solid at this temperature, is two-fold. First, in the dough manufacturing process, it is necessary to strike a balance between the high melting components of the fat, which have the principal improving action in the dough, and the low melting components which aid distribution and thus enhance the effectiveness of the high melting point material; and secondly, the powder material produced by the process containing fat mixed with flour is rendered nonagglomerating and free-flowing by balancing the proportion of high and low melting point fatty material. The dough manufacturing process thus works more smoothly and the product is easy to handle by the user. Although this temperature percentage relationship of 95° to 40% may be varied to some extent without undue detriment to the resulting material, substantial variations should not take place.

It is one of the advantages of the present invention that it provides a method of mixing fatty materials with flours such that emulsifying agents, which are normally materials of relatively high melting point, can be incorporated in flour in the dry state without being pre-emulsified to make them effective in a dough. Examples of such fat-like emulsifying agents which can be effectively incorporated in flours and thus in doughs by the method of the present invention are stearyl tartrate, glyceryl monostearate, and diacetyl tartaric acid esters of monoglycerides and other partial glyceryl ester. In addition to stearyl tartrate, other solid (at 95° F.) esters of an acid and a fatty alcohol containing at least 8 and preferably at least 12 carbon atoms may be incorporated in flour by the present method in order to achieve their maximum effectiveness. Also, esters of stearyl alcohol with citric phosphoric acids are useful for the present purpose and esters of cetyl alcohol with tartaric, phosphoric or citric acids are also useful when incorporated in flours by the present method. Fully or partially hydrogenated animal or vegetable fats may also be successfully mixed with flour according to the present invention.

Three specific examples of fatty mixtures which have excellent effects on the characteristics of a flour when incorporated therein by the method of the present invention are as follows:

| Material: | Weight percentage |
|---|---|
| (1) Glyceryl monostearate | 40 |
| Stearyl tartrate | 20 |
| Lecithin | 40 |
| (2) Stearyl tartrate | 40 |
| Refined and deodorized lard | 20 |
| Lecithin | 40 |
| (3) Stearyl tartrate | 60 |
| Lecithin | 40 |

If, in the case of the three specific examples of fatty mixtures set out above, the ambient temperature becomes too high, for example, above 70° to 80° F., the mixture of fat and flour becomes too sticky to leave the chamber 22 and the cyclone 42 easily. In such case, means are provided to cool the air carrying the flour to the chamber 22 in order to ensure that the mixture of fat and flour remains sufficiently friable to flow freely out of the chamber and the cyclone.

The mixture of flour material and fatty material prepared according to the present invention may be used without further modification but in the case of a bread improver, for example, other non-fat materials may be added to produce a composite bread improver or dough conditioner. Examples of additional materials which may be added are, yeast stimulating preparations, oxidizing salts and mould inhibitors.

The quantity of fatty material added to dough as a constituent of a fatty concentrate or bread improver prepared according to the present invention may be as little as 0.07% based on the total weight of flour in the dough and rarely more than 0.7% by weight of the total weight of flour. The ratio by weight of fat to flour in the concentrate can be between 1:0.5 and 1:5 but preferably lies between 1:1 and 1:2.

The above description of the present invention is of the presently preferred method and apparatus; and it is to be understood that various changes thereto may be made without departing from the scope of the invention as set forth in the following claims.

I claim:
1. A method of preparing a mixed product incorporating fatty material and flour material comprising the steps of:
   (a) blowing said flour material into a chamber by an air current to form a dusty atmosphere of flour particles in said chamber;
   (b) melting a fatty material which comprises 40% by weight glyceryl monostearate, 20% by weight stearyl tartrate and 40% by weight lecithin;
   (c) spraying said melted fatty material into said atmosphere of flour particles in an atomized condition;
   (d) maintaining the temperature in said chamber sufficiently below the melting point of said fatty material to cause said fatty material to solidfy into solid fat particles;
   (e) settling said flour particles and the solid fat particles in said chamber to form a mixed product; and
   (f) removing the mixed product from said chamber.
2. A method of preparing a mixed product incorporating fatty material and flour material comprising the steps of:
   (a) blowing said flour material into a chamber by an air current to form a dusty atmosphere of flour particles in said chamber;
   (b) melting a fatty material which comprises 40% by weight stearyl tartrate, 20% by weight refined and deodorized lard, and 40% by weight lecithin;
   (c) spraying said melted fatty material into said atmosphere of flour particles in an atomized condition;
   (d) maintaining the temperature in said chamber sufficiently below the melting point of said fatty material to cause said fatty material to solidify into solid fat particles;
   (e) settling said flour particles and the solid fat particles in said chamber to form a mixed product; and
   (f) removing the mixed product from said chamber.
3. A method of preparing a mixed product incorporating fatty material and flour material comprising the steps of:
   (a) blowing said flour material into a chamber by an air current to form a dusty atmosphere of flour particles in said chamber;
   (b) melting a fatty material which comprises 60% by weight stearyl tartrate and 40% by weight lecithin;
   (c) spraying said melted fatty material into said atmosphere of flour particles in an atomized condition;
   (d) maintaining the temperature in said chamber sufficiently below the melting point of said fatty material to cause said fatty material to solidify into solid fat particles;
   (e) settling said flour particles and the solid fat particles in said chamber to form a mixed product; and
   (f) removing the mixed product from said chamber.

References Cited

UNITED STATES PATENTS

| | | | |
|---|---|---|---|
| 1,242,883 | 10/1917 | Kohman et al. | 99—94 |
| 1,242,884 | 10/1917 | Kohman et al. | 99—94 |
| 2,835,588 | 5/1958 | Alexander et al. | 99—94 |

FOREIGN PATENTS

| | | | |
|---|---|---|---|
| 20,715 | 7/1930 | Australia | 99—118 |
| 652,006 | 4/1951 | Great Britain | 99—91 |

LIONEL M. SHAPIRO, Primary Examiner

J. R. HOFFMAN, Assistant Examiner

U.S. Cl. X.R.

99—91